(12) United States Patent
Fujita

(10) Patent No.: US 7,097,238 B2
(45) Date of Patent: Aug. 29, 2006

(54) FLOOR PANEL FOR AN AUTOMOBILE

(75) Inventor: Mitsuo Fujita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/116,027

(22) Filed: Apr. 5, 2002

(65) Prior Publication Data

US 2002/0145307 A1 Oct. 10, 2002

(30) Foreign Application Priority Data

Apr. 6, 2001 (JP) .......................... P2001-108346

(51) Int. Cl.
*B62D 25/20* (2006.01)
(52) U.S. Cl. .................. 296/193.07; 296/187.08; 296/204
(58) Field of Classification Search .......... 296/75, 296/193, 203.01, 204, 193.07, 187.08
See application file for complete search history.

(56) References Cited

U.S. PATENT DOCUMENTS

| | | | | |
|---|---|---|---|---|
| 2,230,448 A | * | 2/1941 | Best ......................... | 296/204 |
| 2,613,986 A | * | 10/1952 | Heyl, Jr. .................. | 296/204 |
| 3,010,756 A | * | 11/1961 | Barenyi ................... | 296/204 |
| 3,419,303 A | * | 12/1968 | Eggert, Jr. et al. ........ | 296/204 |
| 4,014,587 A | * | 3/1977 | Eggert, Jr. ............... | 296/204 |
| 4,402,545 A | * | 9/1983 | Utsunomiya et al. ..... | 296/204 |
| 4,457,555 A | * | 7/1984 | Draper .................... | 296/186 |
| 4,511,176 A | * | 4/1985 | Watanabe et al. ........ | 296/204 |
| 4,572,571 A | * | 2/1986 | Malen ..................... | 296/197 |
| 4,593,949 A | * | 6/1986 | Tanimoto ................. | 296/204 |
| 4,712,829 A | * | 12/1987 | Hurten et al. .......... | 296/203.02 |
| 4,865,378 A | * | 9/1989 | Filtri et al. ............ | 296/193.07 |
| 5,129,700 A | * | 7/1992 | Trevisan et al. ....... | 296/193.07 |
| 5,788,322 A | * | 8/1998 | Wolf et al. ............. | 296/186 |

FOREIGN PATENT DOCUMENTS

| | | | | | |
|---|---|---|---|---|---|
| EP | 433903 A1 | * | 6/1991 | ............ | 296/203.01 |
| GB | 1 211 433 | | 11/1970 | ................ | 296/204 |
| JP | 57201777 A | * | 12/1982 | ............ | 296/203.01 |
| JP | 60-195274 U | | 12/1985 | | |
| JP | 63-156876 U | | 10/1988 | | |
| JP | 03193568 A | * | 8/1991 | ................ | 296/204 |
| JP | 4-185587 A | | 7/1992 | | |
| JP | 2000-085382 | | 3/2000 | | |

OTHER PUBLICATIONS

European Search Report, EP 02 00 7760.8, Abstract.

(Continued)

*Primary Examiner*—D. Glenn Dayoan
*Assistant Examiner*—Greg Blankenship
(74) *Attorney, Agent, or Firm*—Arent Fox PLLC

(57) ABSTRACT

A floor panel including a protrusion portion which extends in a transverse direction of a vehicle and crosses a floor tunnel. The protrusion portion ensures a rigidity of the floor panel in the transverse direction of the vehicle. Therefore, it is possible to make a floor panel thinner while maintaining its rigidity. In particular, when a cross portion of a floor tunnel and a protrusion portion is protruded more than any other portion of the floor panel, the rigidity of the floor panel is increased. Further, when the protrusion portion is provided under a front seat and a slope face connects the top of the protrusion portion to floor face, a space under the rear side of the protrusion portion is available for disposing a fuel tank. Therefore, space efficiency is improved. Further, the slope face is available for a rear-seat footrest.

6 Claims, 2 Drawing Sheets

OTHER PUBLICATIONS

Patent Abstract of Japan, vol. 1998, No. 10, Aug. 31, 1998 (JP 10 138956 A (Suzuki Motor Corp.), May 26, 1998).

Patent Abstract of Japan, vol. 1996, No. 09, Sep. 30, 1996 (JP 08 119152 A (Toyota Motor Corp.), May 14, 1996).

Patent Abstract of Japan, vol. 2000, No. 16, May 8, 2001 (JP 2001 010541 A (Honda Motor Co Ltd.), Jan. 16, 2001.

* cited by examiner

FLOOR PANEL FOR AN AUTOMOBILE

BACKGROUND OF THE INVENTION

1. Field of the Invention

The present invention relates to a floor panel for an automobile. More particularly, the invention relates to a floor panel having a floor tunnel and a protrusion portion extending in a direction opposing a direction of the floor tunnel and crossing the floor tunnel which provides a rigid and lightweight floor panel.

2. Description of the Related Art

In the related art, a floor panel for a sedan or a wagon is formed by molding press of a thin steel sheet. A protrusion portion of the floor panel is provided at a center portion of the lateral length of a vehicle. The protrusion portion of the floor panel extends frontward and rearward from the center portion.

The protrusion portion for a front engine rear drive vehicle (FR vehicle) is fundamentally formed for passing a propeller shaft through the protrusion portion and is sometimes referred to as a floor tunnel. The propeller shaft is provided to transmit a driving force of an engine to a rear axle.

However, in a front engine front drive vehicle (FF vehicle), it is not necessary to provide the propeller shaft with the protrusion portion. In this case, the protrusion portion is formed for increasing the rigidity of the vehicle.

Further, the protrusion portion or floor tunnel is effective for taking a bending moment between the front and rear axles. However, since the floor tunnel does not ensure a sufficient rigidity of the floor panel in the transverse direction of the vehicle, the rigidity in the transverse direction is maintained by welding a cross member and a seat-rail mount portion, which are separately provided with the floor panel in the related art.

Therefore, the known structure of the floor panel including the welded cross member, the seat-rail portion, etc., makes it difficult to decrease a production process of the floor panel and the weight of the vehicle.

SUMMARY OF THE INVENTION

It is an object of the present invention to provide a floor panel which ensures a sufficient rigidity of the floor panel in both transverse and lateral directions of the floor panel.

It is another object of the invention to provide a floor panel having a protrusion portion which allows for a thickness of the floor panel to be reduced, which accordingly reduces the weight of the floor panel.

Yet another object of the invention is to provide a floor panel which improves space efficiency of a vehicle and increases passenger comfort.

To achieve these objectives, according to a first aspect of the invention, a floor panel for a vehicle comprises a floor tunnel and a protrusion portion extending in a direction opposing a direction of the floor tunnel and crossing the floor tunnel. The protrusion portion ensures sufficient rigidity of the floor panel, for example, in a transverse direction of the vehicle, so that the thickness of the floor panel can be reduced.

Further, according to the invention when a cross portion of the floor tunnel and the protrusion portion extending in the transverse direction is protruded more than any other portion of the floor panel, the rigidity of the floor panel is also increased.

In addition, when the protrusion portion of the floor panel is provided under a front seat and the top surface of the protrusion portion is connected to the floor face under a rear seat by a slope face, a fuel tank, etc. can be provided under the protrusion portion. Therefore, a space efficiency of a vehicle is improved. Further still, the slope face may be available for a rear-seat footrest.

DETAILED DESCRIPTION OF A PREFERRED EMBODIMENT

Referring now to the accompanying drawings, description will be given of a preferred embodiment of the invention.

Figure 1:
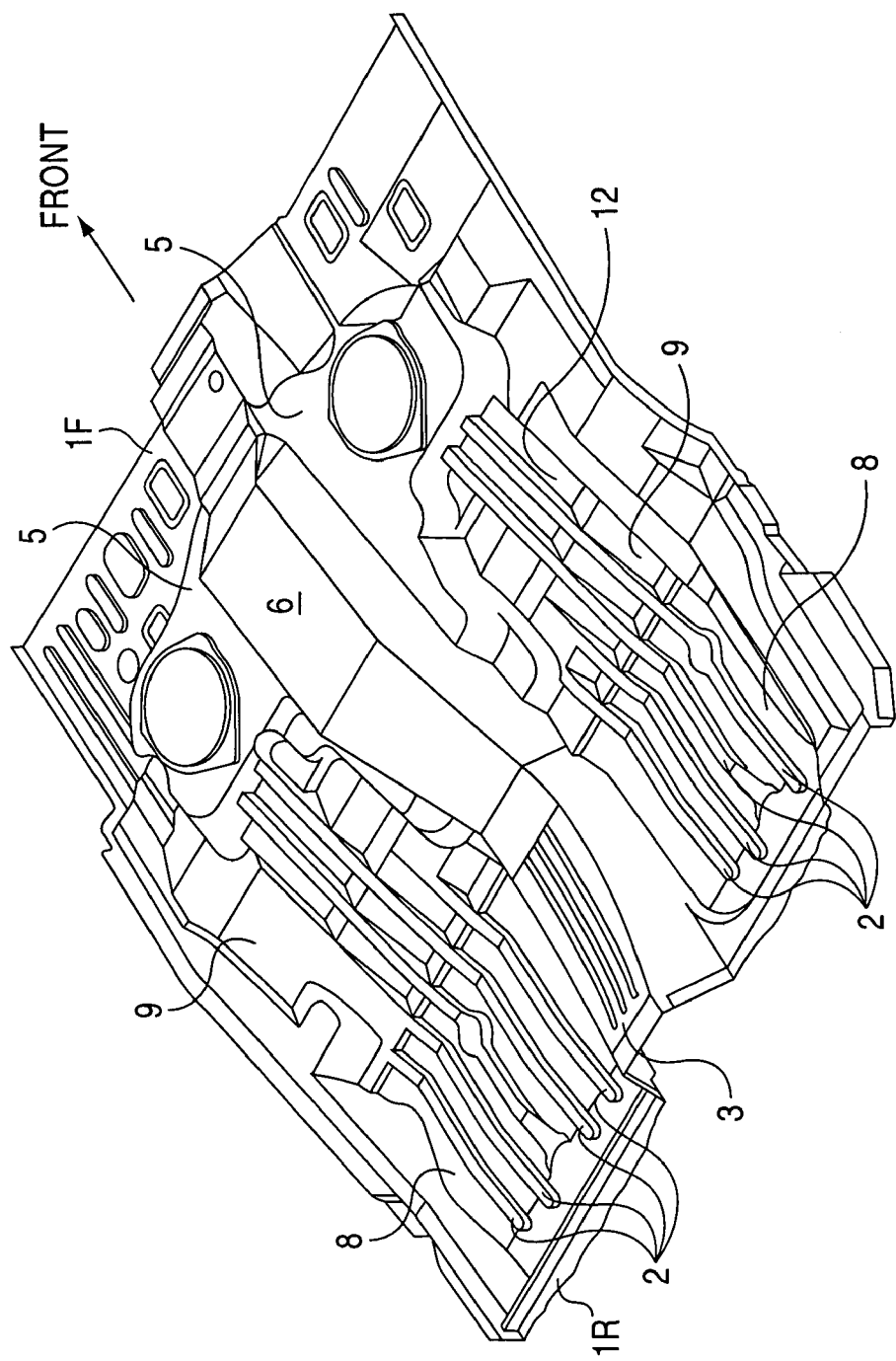
FIG. 1 is a perspective view showing a floor panel of an embodiment of the present invention.

FIG. 1 is a floor panel of an embodiment of the invention. A floor panel 1 is connected to a front dashboard (not shown) of a vehicle at an end portion 1F and connected to a mid-cross member integrally provided with a floor face of a luggage room at an end portion 1R.

The floor panel 1 is made of one thin metal plate by molding press. The floor panel 1 is provided with a plurality of beads 2 extending in a lateral direction of the vehicle. The beads 2 are provided in parallel with one another in the floor panel 1. The beads 2 are provided to compensate for the decreased rigidity of the floor panel because of the use of the thin metal plate of the floor panel 1.

Figure 2:
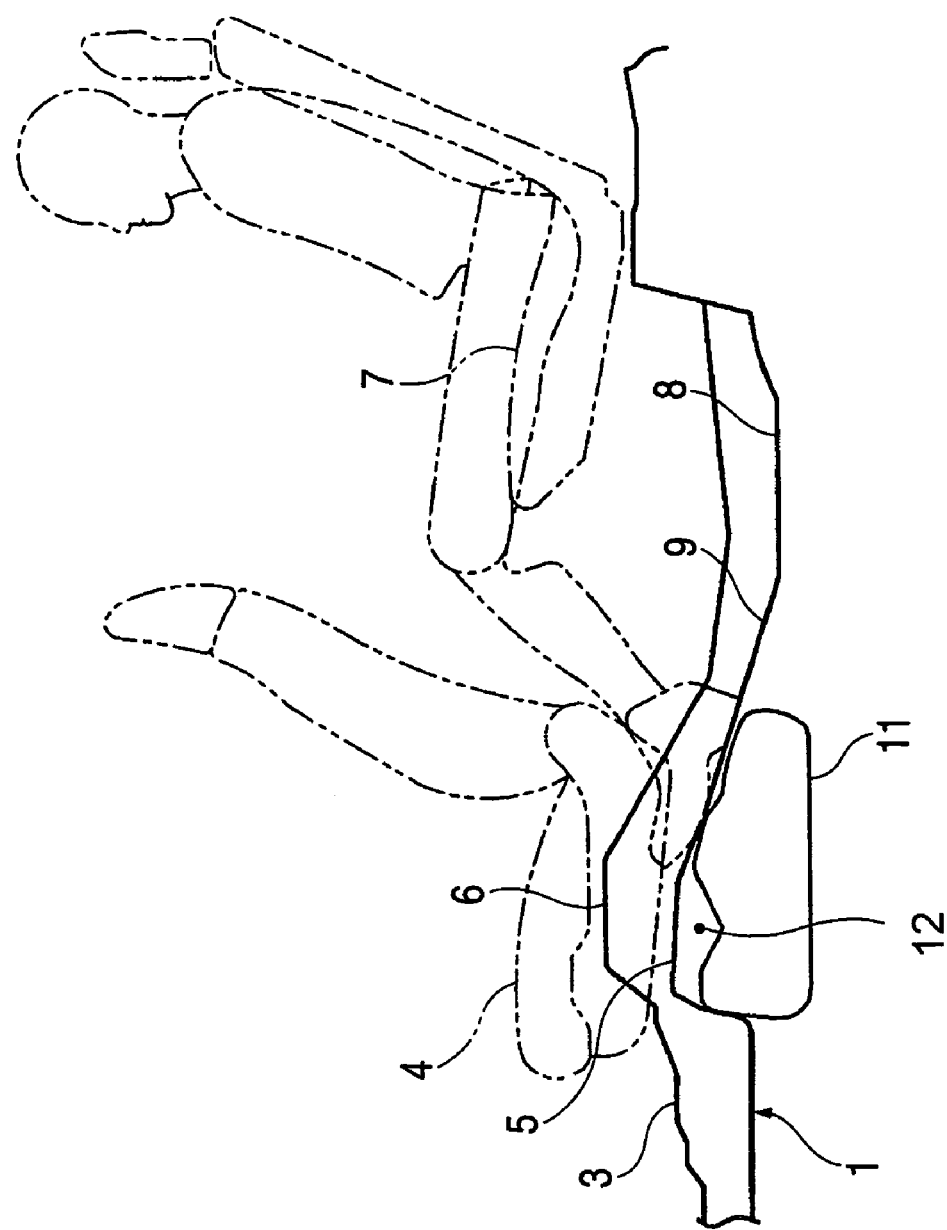
FIG. 2 is a sectional view showing a vehicle along a centerline in a direction of a lateral length of a vehicle.

The floor panel 1 is provided with a floor tunnel 3 at the center of the floor panel 1. The floor tunnel 3 in this embodiment is of a trapezoidal shape in sectional view. The floor tunnel 3 extends frontward and rearward in the lateral direction of the vehicle to compensate for a flexural rigidity of the floor panel I in the lateral direction. A front portion of the floor tunnel 3, that is, a portion under a front seat 4 (refer to FIG. 2), is provided with a protrusion portion 5 which extends in the transverse direction of the vehicle and crosses the floor tunnel 3 in order to ensure a sufficient flexural rigidity of the floor panel 1 in the transverse direction of the vehicle.

In particular, a cross portion 6 of the floor tunnel 3 and the protrusion portion 5 are protruded more than any other portion of the floor panel 3 for increasing the rigidity of the cross portion 6. It is preferred that the cross portion 6 be formed of one plate by molding press, but the cross potion 6 may be formed by welding another plate or other known mechanical and chemical joining techniques.

Thus, when the protruded cross portion 6 crossing the floor tunnel 3 and the protrusion portion 5 are formed of one metallic plate by molding press, the floor panel 1 may be made thinner, which decreases the weight of the vehicle and also decreases the number of steps in the production process of the floor panel 1.

The floor panel 1 is provided with a slope face 9 extending from a top of the protrusion portion 5 to a floor face 8. A stagger portion 12 forming a space in a lower face of the protrusion portion 5 is provided with a fuel tank 11. Thus, a rear seat 7 may be provided more rearwardly without narrowing a luggage room. Therefore, the space for an occupant may be enlarged which accordingly, improves rear-seat comfort.

Further, since the slope 9 is available for a rear-seat footrest, the protrusion protruded within the vehicle compartment may be available for the rear seat footrest. Therefore, the protrusion is not obstacle in the vehicle compartment.

In addition, the slope 9 may be provided with a stagger portion 12 in order to heighten a rigidity of the slope 9. Further still, as shown in FIG. 1, a part of the beads 2 is provided in both sides of the slope, so that the rigidity of the slope and the floor panel is further increased.

As described above in the present invention, a floor panel for a vehicle comprises a floor tunnel and a protrusion portion extending in a direction opposing a direction of the floor tunnel and crossing the floor tunnel. The protrusion portion ensures sufficient rigidity of the floor panel, for example, in a transverse direction of the vehicle, so that the thickness of the floor panel can be reduced. Further, according to the invention when a cross portion of the floor tunnel and the protrusion portion extending in the transverse direction is protruded more than any other portion of the floor panel, the rigidity of the floor panel is also increased.

In addition, when the protrusion portion of the floor panel is provided under a front seat and the top surface of the protrusion portion is connected to the floor face under a rear seat by a slope face, a fuel tank, etc. can be provided under the protrusion portion. Therefore, a space efficiency of a vehicle is improved. Further still, the slope face may be available for a rear-seat footrest.

The present invention is not limited to the specific above-described embodiment. It is contemplated that numerous modifications may be made to the present invention without departing from the spirit and scope of the invention as defined in the claims.

What is claimed is:

1. A floor panel for a vehicle, comprising:
   a floor tunnel; and
   a protrusion portion extending in the transverse direction opposing a direction of the floor tunnel and crossing the floor tunnel;
   wherein the protrusion portion is provided under a front seat, and a slope portion of the floor panel connects a top of the protrusion to a floor face at a rear portion of the vehicle; and
   wherein the floor panel is provided with a bead which extends between the top of the protrusion portion and the floor face.

2. The floor panel according to claim 1, wherein the slope face is provided with a stagger portion.

3. The floor panel according to claim 1, wherein the bead extends in a front to rear direction of the vehicle.

4. A floor panel for a vehicle, comprising:
   a floor tunnel; and
   a protrusion portion extending in the transverse direction opposing a direction of the floor tunnel and crossing the floor tunnel;
   wherein the protrusion portion is provided under a front seat, and a slope portion of the floor panel connects a top of the protrusion to a floor face at a rear portion of the vehicle; and
   wherein the floor panel is provided with a bead which extends between the top of the protrusion portion and the floor face;
   wherein a crossing portion of the floor tunnel and the protrusion portion is protruded more than any other portion of the floor panel.

5. The floor panel according to claim 4, wherein the slope face is provided with a stagger portion.

6. The floor panel according to claim 4, wherein the bead extends in a front to rear direction of the vehicle.

* * * * *